(12) United States Patent
Armstrong et al.

(10) Patent No.: US 6,923,742 B2
(45) Date of Patent: Aug. 2, 2005

(54) POWER TRANSMISSION FOR A VEHICLE

(75) Inventors: Paula J. Armstrong, Canton, MI (US); Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 1 day.

(21) Appl. No.: 10/693,265

(22) Filed: Oct. 24, 2003

(65) Prior Publication Data

US 2005/0090352 A1 Apr. 28, 2005

(51) Int. Cl.$^7$ ............................. F16H 3/62; F16H 3/44
(52) U.S. Cl. ...................... 475/278; 475/282; 475/288
(58) Field of Search ........................... 475/277–8, 282, 475/288; 74/606 R

(56) References Cited

U.S. PATENT DOCUMENTS

| | | | |
|---|---|---|---|
| 4,831,892 A | * | 5/1989 | Shindo et al. ............ 74/606 R |
| 5,106,352 A | | 4/1992 | Lepelletier ................ 475/280 |
| 5,295,924 A | * | 3/1994 | Beim ........................ 475/278 |
| 6,135,912 A | | 10/2000 | Tsukamoto et al. ........ 475/271 |
| 6,176,802 B1 | * | 1/2001 | Kasuya et al. ............. 475/269 |
| 6,464,612 B2 | * | 10/2002 | Frost ........................ 475/288 |
| 6,572,507 B1 | | 6/2003 | Korkmaz et al. ........... 475/276 |
| 6,655,232 B2 | * | 12/2003 | Fujikawa et al. ........ 74/606 R |
| 6,709,360 B2 | * | 3/2004 | Raghavan et al. ......... 475/282 |
| 6,773,370 B2 | * | 8/2004 | Martyka et al. ........... 475/278 |
| 2004/0023745 A1 | * | 2/2004 | Raghavan et al. ......... 475/277 |

* cited by examiner

Primary Examiner—Roger Pang
(74) Attorney, Agent, or Firm—Leslie C. Hodges

(57) ABSTRACT

A power transmission has three planetary gearsets, which are interconnected and also having at least one member continuously drivingly connected with an input shaft. Two of the planetary gearsets are connected with an output shaft. Five torque-transmitting mechanisms are disposed between two end walls and an outer housing, which define four spaces within the power transmission. The torque-transmitting mechanisms are disposed within two or more of the four spaces or combinations of two of the spaces.

1 Claim, 9 Drawing Sheets

US 6,923,742 B2

POWER TRANSMISSION FOR A VEHICLE

TECHNICAL FIELD

This invention relates to power transmissions for vehicles and, more particularly, to multi-speed power transmissions providing a plurality of forward drives and a reverse drive through the selective manipulation of friction torque-transmitting mechanisms.

BACKGROUND OF THE INVENTION

Automatic power transmissions are currently used in a number of passenger vehicles sold within this country. As is well known, the automatic transmission provides a plurality of planetary speed ratios in both the forward direction and at least one reverse speed ratio. These speed ratios are established through the use of a plurality of planetary gearsets, which are controlled by a number of fluid-operated friction torque-transmitting mechanisms, commonly termed clutches and brakes.

It has become a standard to provide at least four forward speed ratios in automatic transmissions for use in passenger vehicles. More recently, automobile manufacturers have increased the forward speed ratios to five and in some instances six. This, of course, requires the addition of planetary gearsets as well as trying to maintain the number of torque-transmitting mechanisms at a minimum.

A number of the currently proposed six-speed planetary transmissions provide three planetary gearsets and five friction torque-transmitting mechanisms. This gives rise to a packaging situation regarding the positioning of the torque-transmitting mechanisms within the transmission environment.

One such transmission is described in U.S. Pat. No. 5,106,352 issued to Lepelletier Apr. 21, 1992. This power transmission provides six forward speed ratios and employs an input gearset and a ratio gearset. The input gearset of Lepelletier has a stationary member in the forward planetary gearset to provide an underdrive input to the ratio gearset, which is preferably a Ravigneaux type set.

U.S. Pat. No. 6,135,912 issued to Tsukamoto, et al. Oct. 24, 2000, provides some solutions for packaging the friction devices within the Lepelletier type of six-speed transmission. However, there are many other six-speed planetary gearsets with five torque-transmitting mechanisms that cannot be accommodated by the Tsukamoto, et al. arrangement.

SUMMARY OF THE INVENTION

It is an object of the present invention to provide an improved power transmission having three planetary gearsets and five torque-transmitting mechanisms providing six forward speed ratios and one reverse speed ratio.

In one aspect of the present invention, one of the planetary gearsets is selectively connectible with a transmission input shaft through two rotating-type torque-transmitting mechanisms.

In another aspect of the present invention, the same two members of the planetary gearset are selectively connectible with a transmission housing through two selectively engageable stationary torque-transmitting mechanisms.

In yet another aspect of the present invention, a member of another of the planetary gearsets is continuously drivingly connected with the transmission input shaft. Also, one member thereof is continuously connected with a member of the first mentioned planetary gearset.

In still another aspect of the present invention, another of the planetary gearsets has one member selectively connectible with the transmission housing through a selectively engageable stationary torque-transmitting mechanism, one member continuously connectible with a member of the first mentioned planetary gearset, and another member continuously connected with a member of the second mentioned planetary gearset.

In yet still another aspect of the present invention, the planetary gearsets and the torque-transmitting mechanisms are disposed within a transmission housing comprised of a forward end wall, a rear end wall, and an outer facing.

In a further aspect of the present invention, one of the planetary gearsets and the forward end wall define a first space, a third of the planetary gearsets and the rear end wall define a second space, the housing cooperates with the end walls and the planetary gearsets to define a third space radially outward of the planetary gearsets, and a fourth space is defined between the first two of the planetary gearsets.

In a yet further aspect of the present invention, the above-defined spaces provide areas of location for the five torque-transmitting mechanisms.

In yet a further aspect of the present invention, at least two of the torque-transmitting mechanisms are disposed within the first mentioned space and have servo-mechanisms that are slidably disposed in stationary components within the first defined space.

In a still further aspect of the present invention, at least one of the stationary-type torque-transmitting mechanisms controlling the member of the third mentioned gearset is disposed within either the second mentioned space or the third mentioned space and includes a servo-mechanism slidably disposed in a stationary portion of one of the spaces.

In a yet still further aspect of the present invention, the remaining two torque-transmitting mechanisms are packaged either within the first defined space, a combination of the first and fourth defined spaces, a combination of the first and third defined spaces, or both are disposed within the fourth defined space.

DESCRIPTION OF EXEMPLARY EMBODIMENTS

Figure 1:
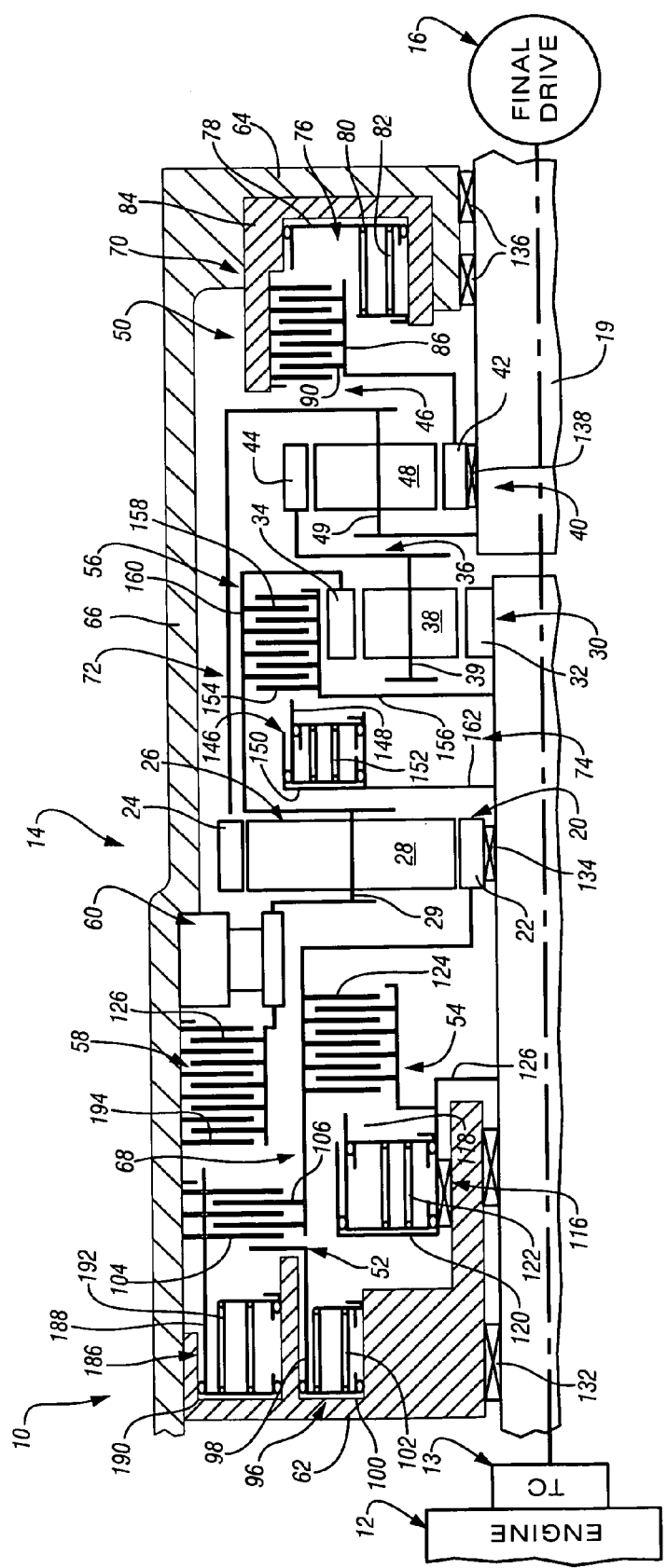
FIG. 1 is a cross-sectional depiction of a first embodiment of the present invention.

Referring to the drawings, wherein like characters represent the same or corresponding parts throughout the several views, there is shown in FIG. 1 a powertrain, generally designated 10, having an engine and torque converter 12, a planetary power transmission 14, and a conventional final drive mechanism 16. The planetary transmission 14 includes an input shaft 17, a planetary gear arrangement 18, and an output shaft 19. The input shaft 17 is drivingly connected with the torque converter portion of the engine and torque converter 12 and the output shaft 19 is drivingly connected with the final drive mechanism 16.

The planetary gear arrangement 18 has three planetary gearsets 20, 30, 40. The planetary gearset 20 has a sun gear member 22, a ring gear member 24, a planet carrier assembly member 26. The planet carrier assembly member 26 includes a plurality of pinion gears 28 rotatably mounted on a planet carrier 29.

The planetary gearset 30 includes a sun gear member 32, a ring gear member 34, and a planet carrier assembly member 36. The planet carrier assembly member 36 includes a plurality of pinion gears 38 rotatably mounted on a planet carrier 39.

The planetary gearset 40 includes a sun gear member 42, a ring gear member 44, and a planet carrier assembly member 46. The planet carrier assembly member 46 includes a plurality of pinion gears 48 rotatably mounted on a planet carrier 49.

Along with the planetary gear arrangement 18, the planetary transmission 14 includes five torque-transmitting mechanisms, generally designated 50, 52, 54, 56, and 58. Also included is a one-way torque-transmitting mechanism 60.

The transmission 14 further includes a first or forward end wall 62, a second or rear end wall 64, and an outer housing 66. The end walls 62 and 64 are secured or otherwise integral with the outer housing 66. The end walls 62 and 64 and outer housing 66 combine to provide a first or forward space 68, a second or rearward space 70, a third or radially outward space 72, and a fourth or inner space 74.

The forward space 68 is defined by the end wall 62, the housing 66, and the planetary gearset 20. The rearward space 70 is defined by the end wall 64, the outer housing 66, and the planetary gearset 40. The outward space 72 is defined by the outer housing 66 and the radially outward area surrounding the planetary gearsets 20, 30, and 40. The inner space 74 is defined between the planetary gearsets 20 and 30 and is radially inward of a portion of the space 72.

The torque-transmitting mechanism 50 includes a fluid-operated servo-mechanism 76, which includes a piston 78, a fluid space 80, and a return spring assembly 82. The torque-transmitting mechanism 50 also includes a housing 84 in which the servo-mechanism 76 is disposed, a hub 86, a plurality of friction plates 88 drivingly connected with the housing 84, and a plurality of friction plates 90 drivingly connected with the hub 86. The hub 86 is continuously connected with the sun gear member 42.

The torque-transmitting mechanism 52 includes a servo-mechanism 96, which is comprised of a fluid-operated piston 98, a space or chamber 100, and a return spring assembly 102. The piston 98 is slidably disposed in the end wall 62 and cooperates therewith to form the chamber 100. The torque-transmitting mechanism 52 includes a plurality of friction plates 104 splined to the housing 66 and a plurality of friction plates 106 splined to a hub 108. The hub 108 is continuously connected with the sun gear 22 of the planetary gearset 20.

The torque-transmitting mechanism 54 includes a servo-mechanism 116 having a fluid-operated piston 118, a fluid chamber 120, and a return spring assembly 122. The torque-transmitting mechanism 54 also includes a plurality of friction plates 124 drivingly connected with a hub 126 and a plurality of friction plates 128 drivingly connected with the hub 108. The hub 126 is drivingly connected with the input shaft 17.

The hub 126 is rotatably supported on an extension 127 formed on the end wall 62 through a bearing or bushing 130. The input shaft 17 is rotatably supported on the end wall 62 through bushings or bearings 132. The sun gear member 22 is rotatably supported on the input shaft 17 through a bushing or bearing 134. The output shaft 19 is rotatably supported on bushings or bearings 136 and the sun gear member 42 is rotatably supported on the output shaft 19 by a bushing or bearing 138.

The ring gear member 24 and planet carrier member 49 are continuously interconnected and are also continuously connected with the output shaft 19. The sun gear member 32 is continuously connected with the input shaft 17. The planet carrier 39 and ring gear member 44 are continuously interconnected, and the ring gear member 34 and the planet carrier member 29 are also continuously interconnected.

The torque-transmitting mechanism 56 includes a servo-mechanism 146, which includes a fluid-operated piston 148, a fluid chamber 150, and a return spring assembly 152. The torque-transmitting mechanism 56 also includes a plurality of friction plates 154, which are splined to a hub 156 secured with the input shaft 17, and a plurality of friction plates 158 splined to a hub 160, which interconnects the ring gear member 34 and the planet carrier member 29. The chamber 150 is formed by a hub or housing 162, which is drivingly connected with the input shaft 17 and the piston 148.

The torque-transmitting mechanism 58 includes a servo-mechanism 186, which includes a fluid-operated piston 188, a chamber 190, and a return spring assembly 192. The torque-transmitting mechanism 58 also includes a plurality of friction plates 194 that are drivingly connected with the housing 66 and a plurality of friction plates 196 that are drivingly connected with a hub 200, which is continuously connected through an inner race 202 of the one-way torque-transmitting mechanism 60 with the planet carrier member 29 and therefore the ring gear member 34.

The planetary transmission 14 is operable to provide six forward speed ratios and one reverse speed ratio between the input shaft 17 and the output shaft 19 through the judicious selection of the torque-transmitting mechanisms 50, 52, 54, 56, and 58, in combinations of two.

The first forward speed ratio is established with the engagement of the torque-transmitting mechanisms 50 and 58. The first or lowest forward speed ratio can also be established with the engagement of the torque-transmitting mechanism 50 and the one-way torque-transmitting mechanism 60.

The second forward speed ratio is established with the engagement of the torque-transmitting mechanisms 50 and 52. The third forward speed ratio is established with the engagement of the torque-transmitting mechanisms 50 and 54. The fourth forward speed ratio is established with the engagement of the torque-transmitting mechanisms 50 and 56. The fifth forward speed ratio is established with the engagement of the torque-transmitting mechanisms 56 and 54. The sixth forward speed ratio is established with the engagement of the torque-transmitting mechanisms 56 and 52. The reverse speed ratio is established with the engagement of the torque-transmitting mechanisms 54 and 58.

Those skilled in the art will immediately recognize that each of these ratio interchanges 1–2, 2–3, 3–4, 4–5, and 5–6 are all single transition interchanges in that only one torque-transmitting mechanism is disengaged while another torque-transmitting mechanism is engaged. This 1:1 swap is called a single transition shift or ratio interchange.

The torque-transmitting mechanism 50 is disposed within the space 70. The torque-transmitting mechanisms 52, 54, and 58 are disposed within the space 68. The torque-transmitting mechanism 56 is disposed within the space 72.

The servo-mechanism of the torque-transmitting mechanism 56, however, is disposed within the space 74. The servo-mechanisms 96 and 186 are disposed within the end wall 62, which is considered within the space 68. The servo-mechanism 116 is rotatably disposed on the end wall 62 and is situated within the space 68. The friction plates for the torque-transmitting mechanisms 52, 54, and 58 are all disposed within the space 68. The torque-transmitting mechanism 50 is disposed within the space 70. The servo-mechanism 76 is situated in the end wall 64 and the friction plates 88 are drivingly connected with the end wall 64.

Those skilled in the art will recognize that the torque-transmitting mechanisms 50, 52, and 58 are all stationary type torque-transmitting mechanisms commonly termed stationary clutches or brakes. The torque-transmitting mechanisms 54 and 56 are rotating type torque-transmitting mechanisms commonly termed clutches. Some of those skilled in the art also refer to brakes, which have friction plates as opposed to friction bands, as clutches and not stationary clutches. However, generically, each of the devices 50, 52, 54, 56, and 58 can be termed a torque-transmitting mechanism.

Figure 2:
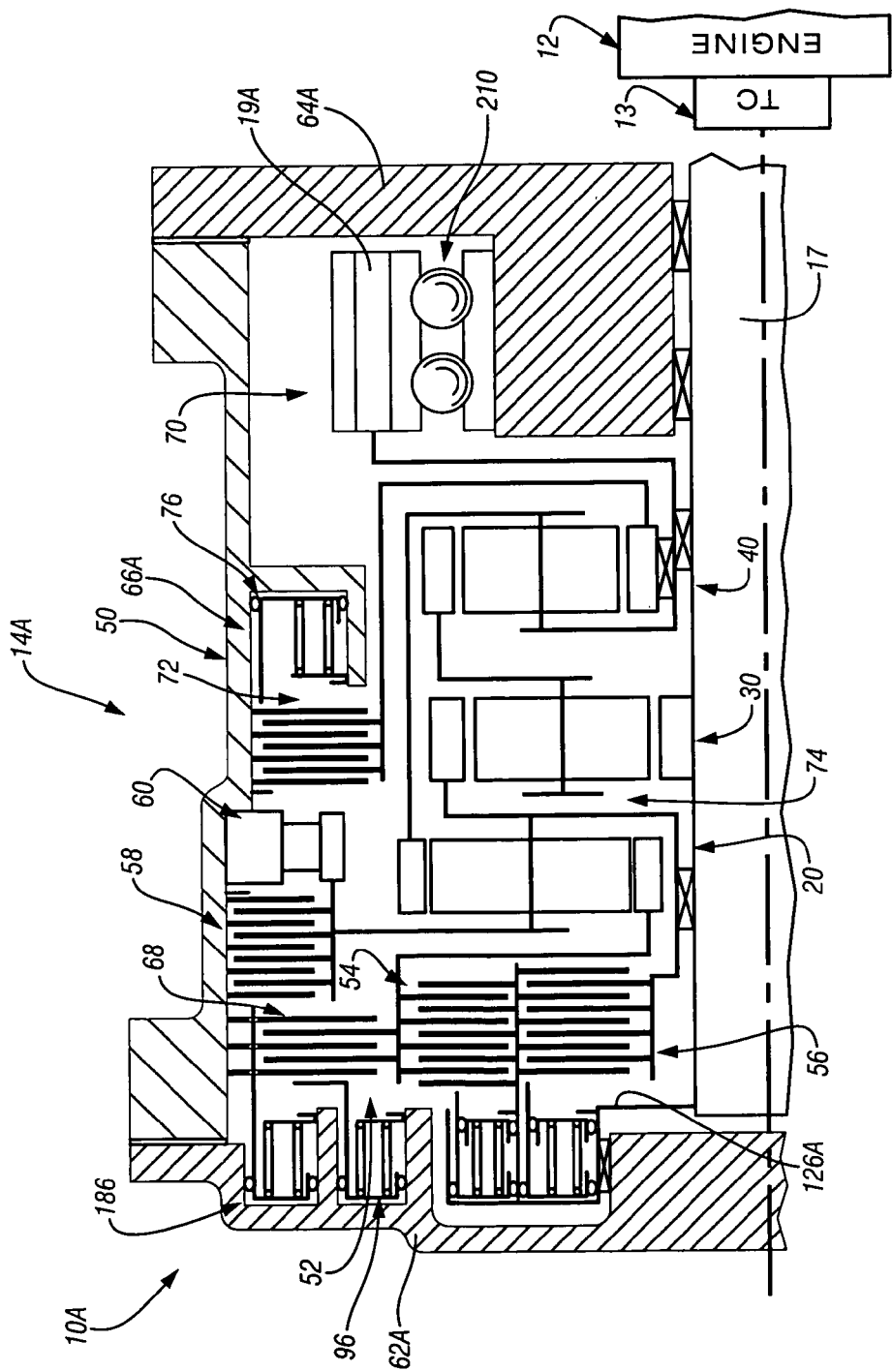
FIG. 2 is a cross-sectional depiction of a second embodiment of the present invention.

A powertrain 10A is shown in FIG. 2. The powertrain 10A includes the same planetary gearsets 20, 30, and 40 as powertrain 10, an input shaft 17, and an output gear 19A. The output gear 19A is rotatably supported through a bearing 210 and the end wall 64A. The engine and torque converter 12 is disposed to provide input drive for the powertrain 10 at the end wall 64A.

A planetary transmission 14A has an end wall 62A, an outer housing 66A, and an end wall 64A. The planetary transmission 14A also includes the five torque-transmitting mechanisms 50, 52, 54, 56, and 58. The torque-transmitting mechanism 58 is located within the space 72 radially outward of the planetary gearsets 20, 30, and 40. The torque-transmitting mechanisms 50, 52, 54, and 56 each have their servo-mechanisms disposed within the space 68 and the friction plates for each of these torque-transmitting mechanisms are also disposed substantially within the space 68.

The servo-mechanisms 116 and 146 for the torque-transmitting mechanisms 54 and 56, respectively, are disposed in a rotatable hub 126A, which is drivingly connected with the input shaft 17.

The planetary transmission 14A provides the same six forward speed ratios and one reverse speed ratio as were provided by the planetary transmission 14. The individual ratios are selectively engaged by the same combination of torque-transmitting mechanisms as was employed for the transmission 14.

Figure 3:
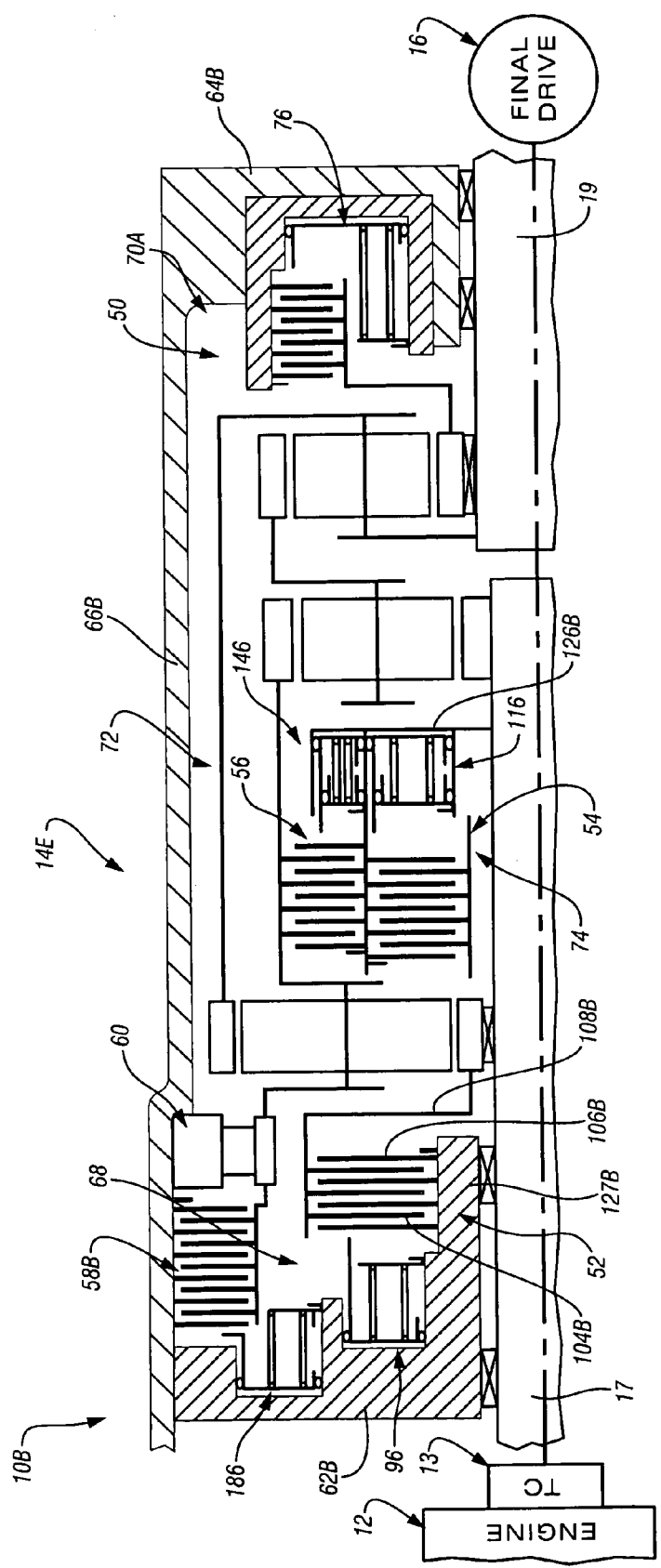
FIG. 3 is a cross-sectional depiction of a third embodiment of the present invention.

The powertrain 10B shown in FIG. 3 has a torque-transmitting mechanism 50 disposed within the space 70. The servo-mechanism 76 has a torque-transmitting mechanism 50 disposed within the end wall 64B. The torque-transmitting mechanisms 52 and 58 are disposed within the space 68 and each of their respective servo-mechanisms 96 and 186 are disposed within the end wall 62B. The friction plates 106B of the torque-transmitting mechanism 52 are drivingly connected with the hub 108B and the plates 104B are drivingly connected with the extension 127B.

The torque-transmitting mechanisms 54 and 56 are disposed within the space 74. The servo-mechanisms 116 and 146 are disposed within a rotating hub 126B, which is drivingly connected with the input shaft 17. The friction plates for the torque-transmitting mechanisms 54 and 56 are also disposed within the space 74, the friction plates for the torque-transmitting mechanisms 52 and 58 are disposed within the space 68, and the friction plates for the torque-transmitting mechanism 50 are disposed within the space 70.

The planetary transmission 14B also provides the same six forward speed ratios as were provided with the transmissions of FIGS. 1 and 2 and the torque-transmitting mechanisms are engaged in the same sequence to provide these speed ratios.

Figure 4:
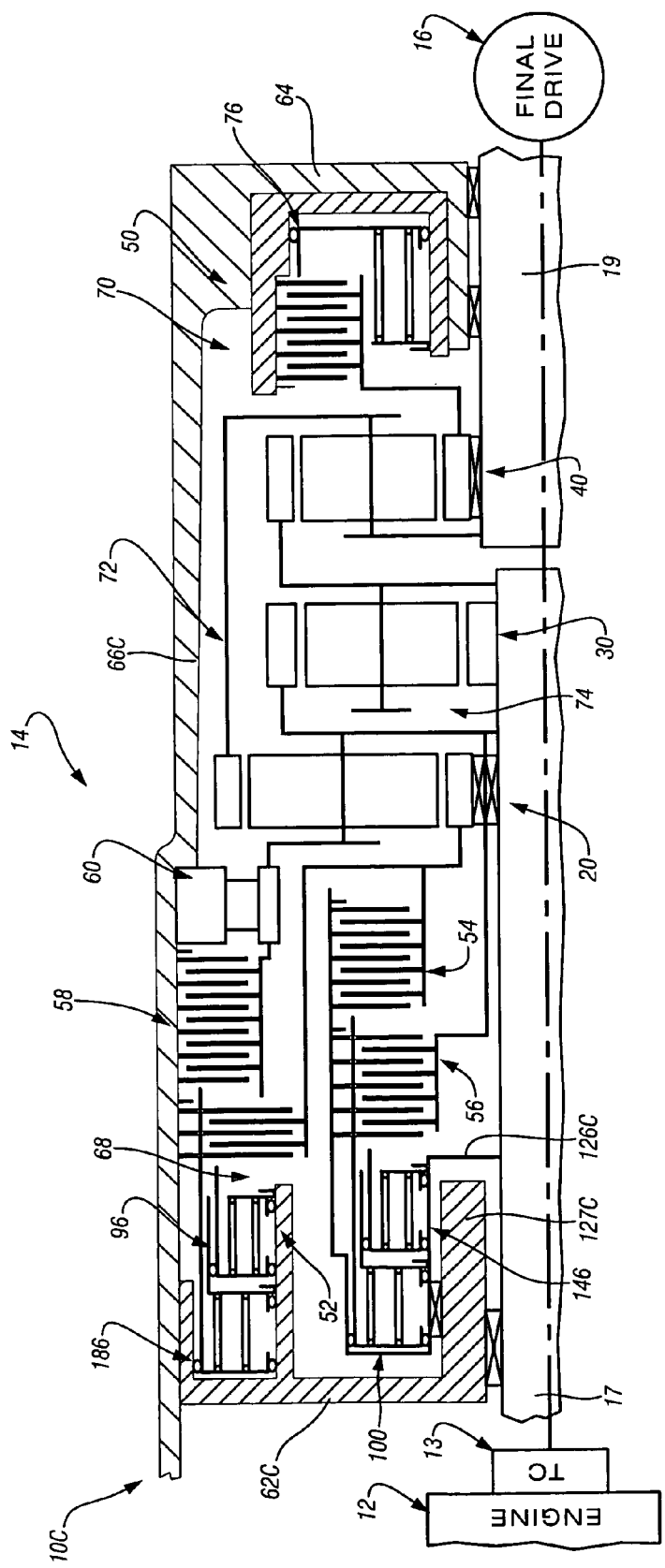
FIG. 4 is cross-sectional depiction of a fourth embodiment of the present invention.

A powertrain 10C shown in FIG. 4 includes a planetary transmission 14C having an input shaft 17, an output shaft 19, as well as the three planetary gearsets 20, 30, and 40. The transmission 14C also includes the five torque-transmitting mechanisms 50, 52, 54, 56, and 58. The torque-transmitting mechanism 50 is disposed within the space 70 and the servo-mechanism 76 thereof is fitted within the end wall 64C. The torque-transmitting mechanisms 52 and 58 are disposed within the space 68 and their respective servo-mechanisms 96 and 186 are slidably disposed within the end wall 62C or components thereof. The torque-transmitting mechanisms 54 and 56 are disposed within the space 68 and their respective servo-mechanisms 116 and 146 are disposed within a hub 126C, which rotatably mounted on the extension 127C and drivingly connected with the input shaft 17.

The servo-mechanism 76 is positioned in the end wall 64C and friction plates for the torque-transmitting mechanism 50 are disposed within the space 70. The friction plates for all of the torque-transmitting mechanisms 52, 54, 56, and 58 are disposed within the space 68. Therefore, the spaces 72 and 74 do not house any of the torque-transmitting mechanisms. This permits the three planetary gearsets 20, 30, and 40 to be combined in a compact arrangement.

The planetary transmission 14C also provides the same six forward speed ratios and reverse speed ratio that are attained with the planetary transmission 14. The torque-transmitting mechanisms 50, 52, 54, 56, and 58 are engaged in the same sequence and combinations to establish the desired speed ratios.

Figure 5:
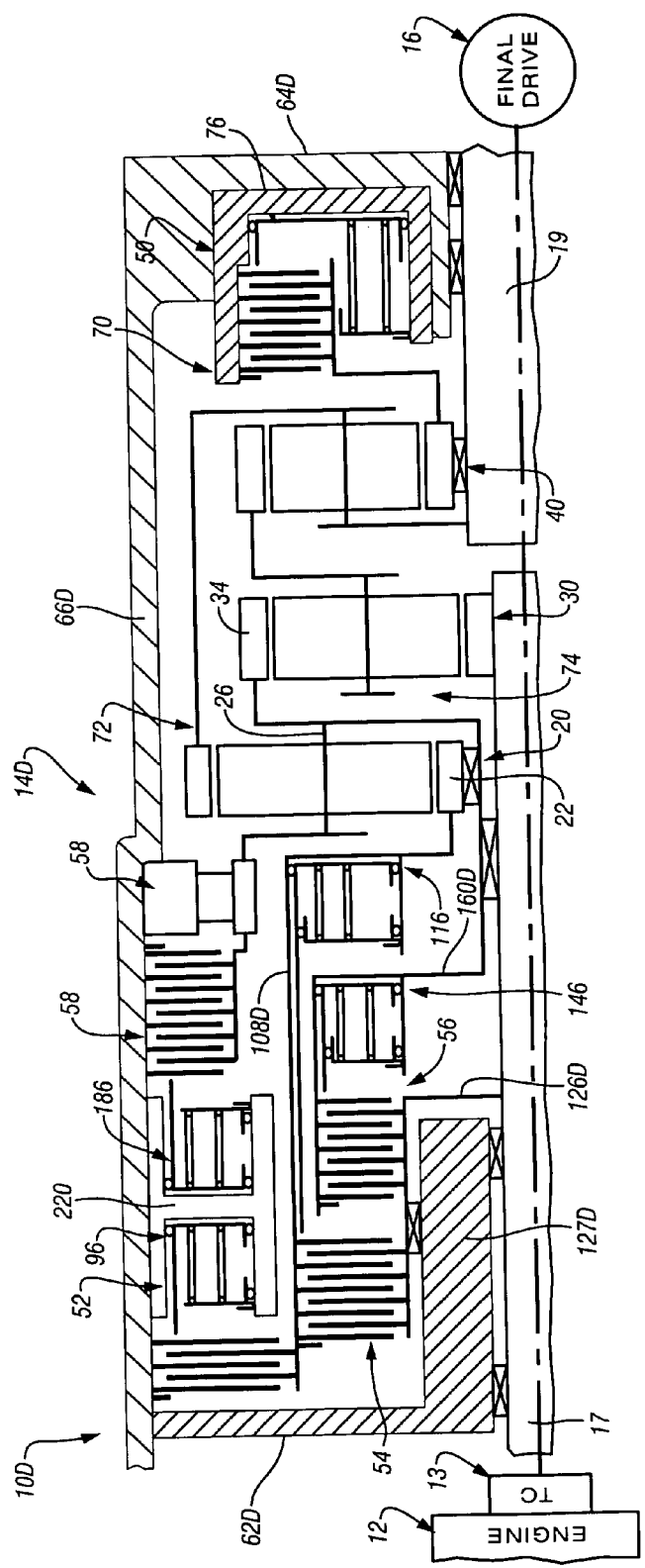
FIG. 5 is a cross-sectional depiction of a fifth embodiment of the present invention.

The powertrain 10D shown in FIG. 5 includes the planetary transmission 14D as having the input shaft 17, the output shaft 19, the three planetary gearsets 20, 30, and 40, and the five torque-transmitting mechanisms 50, 52, 54, 56, and 58. The servo-mechanism 76 for the torque-transmitting mechanism 50 is disposed within the end wall 64D and therefore within the space 70. The torque-transmitting mechanisms 52, 54, 56, and 58 are all disposed within the space 68. As with FIG. 3, the spaces 72 and 74 are not supporting torque-transmitting mechanisms permitting the planetary gearsets 20, 30, and 40 to be compacted within the central portion of the transmission 14D.

The servo-mechanisms 96 and 186 for the torque-transmitting mechanisms 52 and 58, respectively, are disposed within a housing 220, which is secured to the transmission housing 66D within the space 68. The servo-mechanism 116 of the torque-transmitting mechanism 54 is disposed within the hub 108D, which is connected with the sun gear 22 of the planetary gearset 20. The friction plates of the torque-transmitting mechanism 54 are disposed between the hub 108D and the hub 126D which is rotatably mounted on the extension 127D The servo-mechanism 146 of the torque-transmitting mechanism 56 is disposed within a hub 160D, which is connected with the planet carrier assembly 26 of planetary gearset 20 and the ring gear 34 of the planetary gearset 30. The friction plates of the torque-transmitting mechanism 56 are drivingly connected with the hubs 160D and 126D.

The torque-transmitting mechanisms 50, 52, 54, 56, and 58 are selectively engaged in the same sequence and combinations as the engagement of the torque-transmitting mechanisms of the previously described transmissions. The transmission 14D provides the same six forward speed ratios and the reverse speed ratio as the above-described transmissions.

Figure 6:
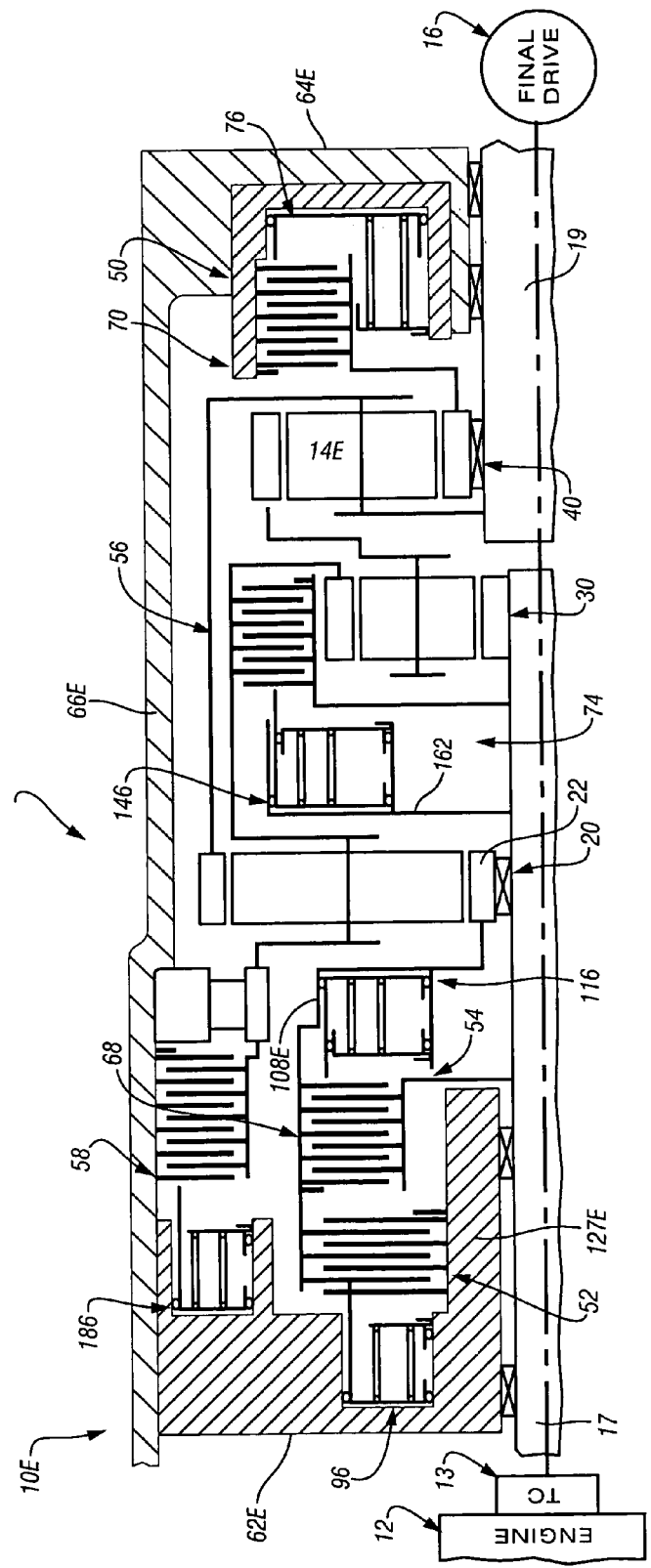
FIG. 6 is a cross-sectional depiction of a sixth embodiment of the present invention.

A powertrain 10E shown in FIG. 6 includes the planetary transmission 14E having the input shaft 17, the output shaft 19, the planetary gearsets 20, 30, and 40, and the five torque-transmitting mechanisms 50, 52, 54, 56, and 58. The torque-transmitting mechanism 50 is disposed within the space 70 such that the servo-mechanism 76 thereof is disposed within an extension of the end wall 64E, which is similar to the transmission shown in FIGS. 1, 3, 4, and 5. The torque-transmitting mechanism 52 is disposed within the space 68 with the servo-mechanism thereof disposed within the wall 62E. The friction plates of the torque-transmitting mechanism 52 are drivingly connectable between the extension 127E and the hub 108E.

The torque-transmitting mechanism 58 is disposed within the space 68 and has the servo-mechanism 186 thereof disposed within the end wall 62E, which is similar to the transmission 14B shown in FIG. 3. The torque-transmitting mechanism 54 is disposed within the space 68 and has the servo-mechanism 116 thereof disposed within the space 68 and mounted within the hub 108E, which is secured with the sun gear member 22. The torque-transmitting mechanism 56 is disposed within the space 74 and the space 72. The servo-mechanism 146 thereof is disposed within the space 74 and is situated in the hub 162. The arrangement of the torque-transmitting mechanism 56 is similar to that shown in FIG. 1, and the torque-transmitting mechanism 54 is similar to that shown in FIG. 1.

As with the previously-described transmissions, the transmission 14E provides six forward speed ratios and one reverse speed ratio through the judicious engagement of the torque-transmitting mechanisms 50, 52, 54, 56, and 58 in combinations of two in the same sequence as described for the previous transmissions.

Figure 7:
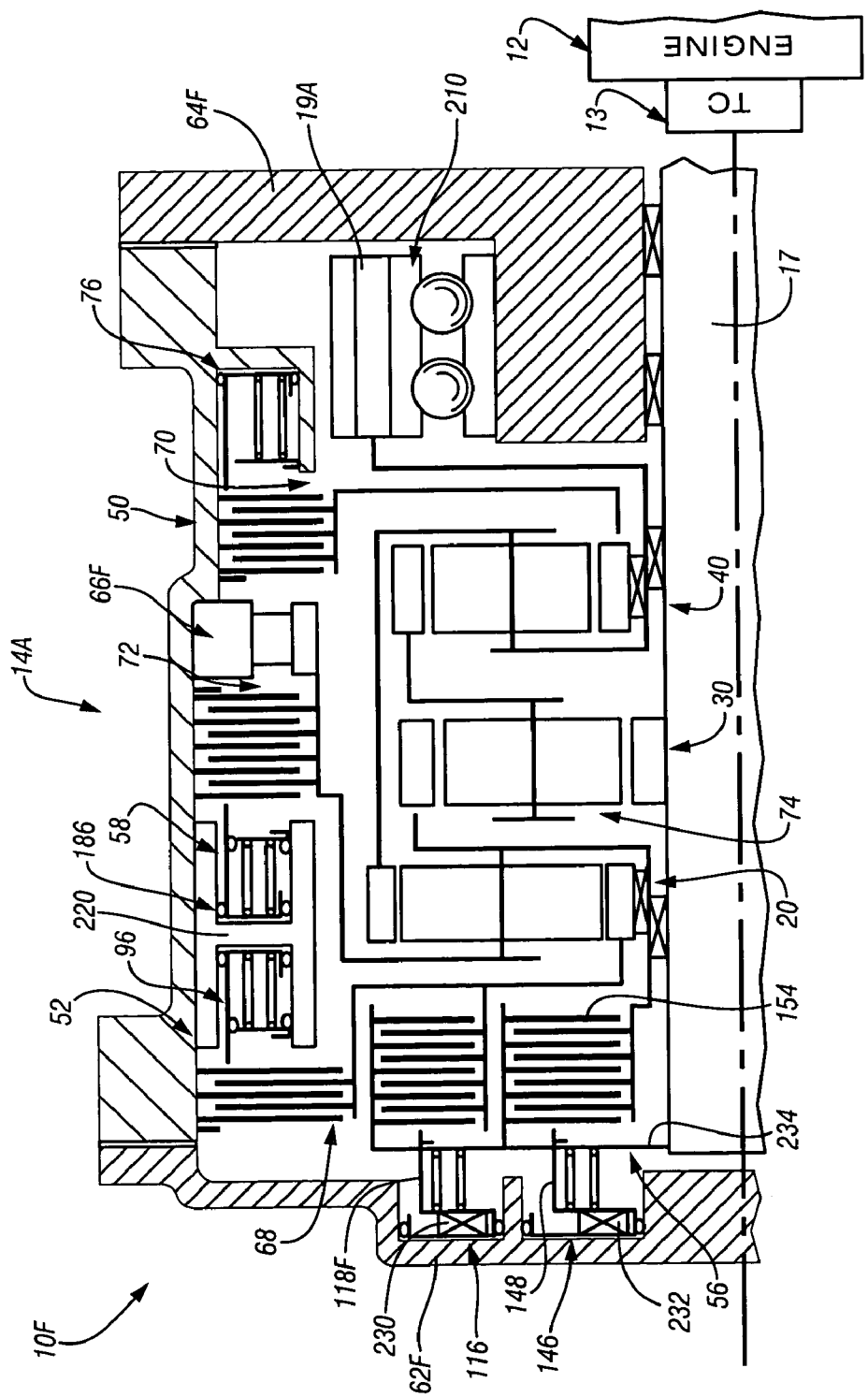
FIG. 7 is a cross-sectional depiction of a seventh embodiment of the present invention.

A powertrain 10F shown in FIG. 7 includes a planetary transmission 14F having an input shaft 17 and an output gear 19A, which is rotatably supported on a bearing 210 in the end wall 64F. The transmission 14F includes the three planetary gearsets 20, 30, and 40 and the five torque-transmitting mechanisms 50, 52, 54, 56, and 58. The structure of the planetary transmission 14F shown in FIG. 7 is similar to that shown in FIG. 2.

The torque-transmitting mechanism 50 is disposed within the space 70 such that the servo-mechanism 76 thereof is disposed within an extension of the housing 66F. The torque-transmitting mechanisms 52 and 58 are disposed substantially radially outward of the planetary gearset 20 and partly situated within the space 72 and within the space 68. The servo-mechanisms 96 and 186, respectively, of these torque-transmitting mechanisms 52 and 58 are disposed within the housing 220 similar to that shown in FIG. 5. The torque-transmitting mechanisms 54 and 56 are disposed within the space 68 and the servo-mechanisms 116 and 146, respectively, are disposed within the end wall 62F. The servo-mechanisms 116 and 146 are stationary pistons. That is, the pistons are nonrotating and are separated from respective apply plates 118F and 148F by bearings 230 and 232, respectively.

Stationary-type pistons for rotating-type torque-transmitting mechanisms are well known within the art. The servo-mechanisms 146 and 116 differ from their counterparts previously described by the deployment of the anti-friction bearings 230 and 232, respectively, between the apply piston and the apply plate of each of the respective torque-transmitting mechanisms 54 and 56. The friction plates 124 and 154, respectively, of the torque-transmitting mechanisms 54 and 56 are drivingly connected with the input shaft 17 through a hub 234.

The planetary transmission 14F also provides six forward speed ratios and one reverse speed ratio as described for the transmissions previously described. By positioning three of the torque-transmitting mechanisms in the space 68 and one of the torque-transmitting mechanisms in the space 72 and one of the torque-transmitting mechanisms in the space 70, a compact transmission lengthwise is provided. However, this transmission will require a slightly larger barrel size than, for example, the transmission shown in FIG. 4.

Figure 8:
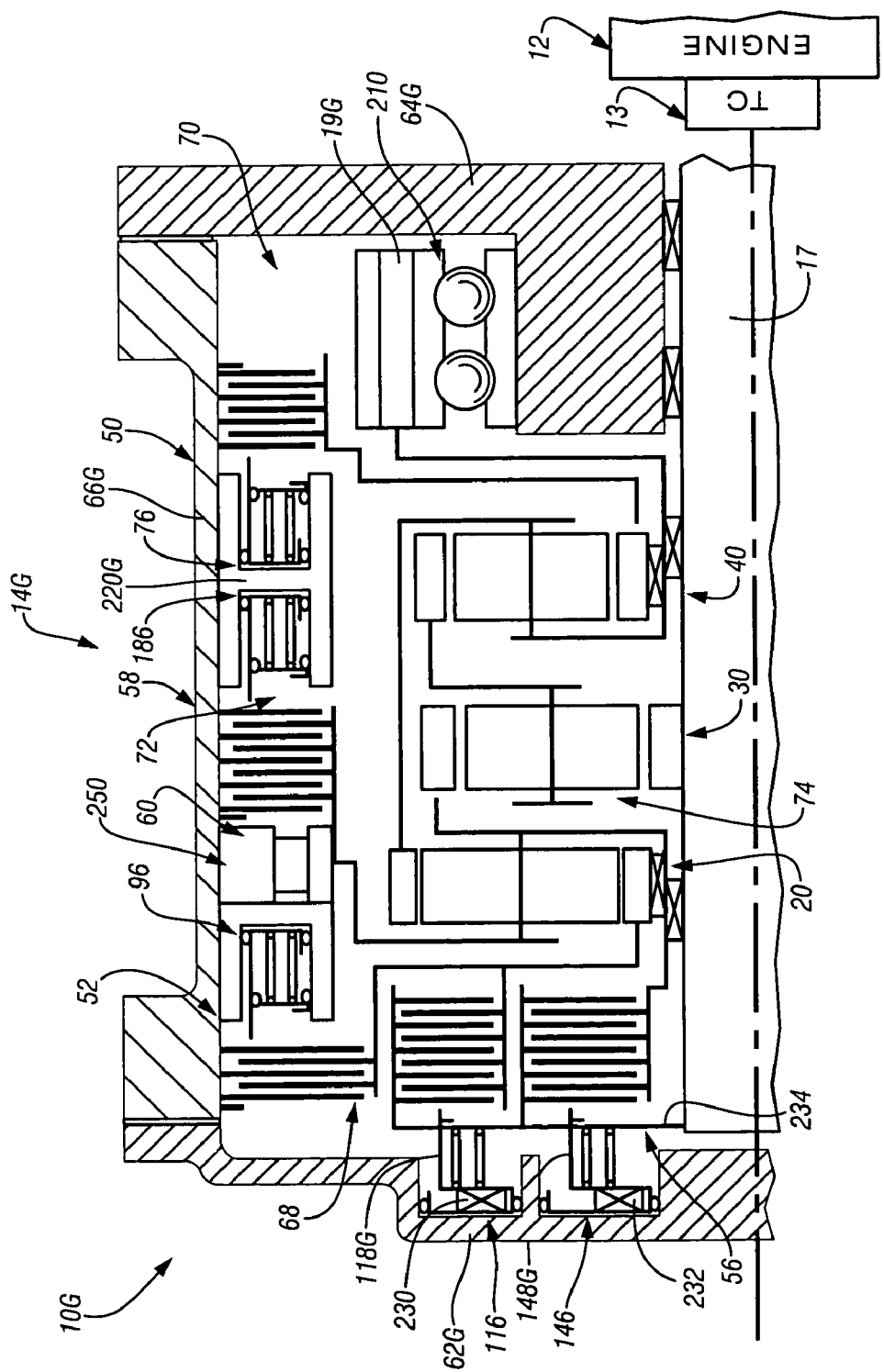
FIG. 8 is a cross-sectional depiction of an eighth embodiment of the present invention.

A powertrain 10G shown in FIG. 8 includes a planetary transmission 14G having the three planetary gearsets 20, 30, and 40 and the five torque-transmitting mechanisms 50, 52, 54, 56, and 58. The torque-transmitting mechanisms 54 and 56, as well as that of their respective servo-mechanisms 116 and 146 are similar to that described in FIG. 7. The torque-transmitting mechanism 50 is disposed within the space 70 and the servo-mechanism 76 thereof is disposed within a housing 220G, which is secured to the housing 66G. The torque-transmitting mechanism 52 is disposed within the space 68 and is similar in construction to that shown in FIG. 7. The servo-mechanism 96 of the torque-transmitting mechanism 52 is disposed in an extension 250 of the housing 66G. The torque-transmitting mechanism 58 is disposed within the space 72. The servo-mechanism 186 of the torque-transmitting mechanism 58 is disposed within the housing 220G.

The power transmission 14G will provide the same six forward speed ratios and one reverse speed ratio as described for the previously mentioned transmissions. The structure of the transmission 14G is similar to that of transmission 14F in that it is thus suited for front wheel drive or transverse drive applications. Again, the transmission of 14G is compact in the axial direction but requires slightly larger barrel space to accommodate the friction devices in spaces 72 and 70.

Figure 9:
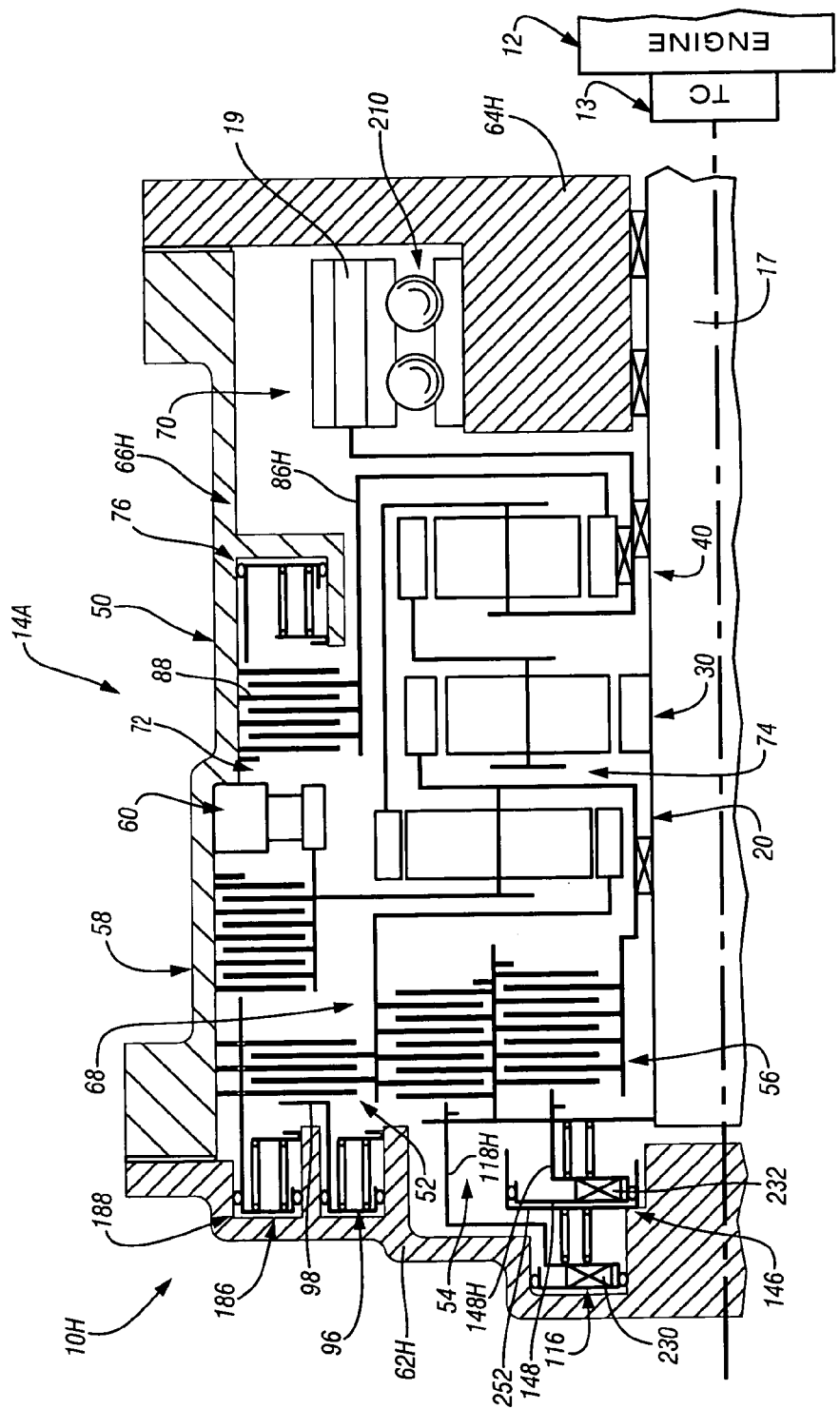
FIG. 9 is a cross-sectional depiction of a ninth embodiment of the present invention.

A powertrain 10H shown in FIG. 9 includes a planetary transmission 14H having three planetary gearsets 20, 30, and 40 and the five torque-transmitting mechanisms 50, 52, 54, 56, and 58. The torque-transmitting mechanism 50 is disposed within the space 72 such that the servo-mechanism 76 thereof is disposed within an extension of the housing 66H and the friction plates 88, 90 are drivingly connected with the housing 66H and a hub 86H, respectively. The torque-transmitting mechanism 52 is disposed within the space 68 and has piston 98, of the servo-mechanism 96, slidably disposed in the end wall 62H. The torque-transmitting mechanism 58 is also disposed within the space 68 and the servo-mechanism 186 has the piston 188 thereof slidably disposed within the end wall 62H. The torque-transmitting mechanisms 54 and 56 are both disposed within the space 68. The servo-mechanism 116 of the torque-transmitting mechanism 54 is disposed within the end wall 62H and is similar in construction to the torque-transmitting mechanism 54 shown in FIG. 8. The torque-transmitting mechanism 54 has an apply plate or piston extension 118H, which engages the friction plates 124, 128 thereof. The torque-transmitting mechanism 56 has the servo-mechanism 146 has the piston 148 thereof slidably disposed in a hub 252, which is secured with the end wall 62H.

The servo-mechanism 146 includes a bearing 232, which separates the piston 148 from an apply plate 148H. As with the torque-transmitting mechanisms 54 and 56 shown in FIG. 8, both of these torque-transmitting mechanisms are of the stationary piston type. Those skilled in the art will recognize that the planetary transmission 14H as well as the planetary transmissions 14A, 14F, and 14G are suitable for disposition within a vehicle having front wheel or transverse type drive. The linear compactness is offset by slight increase in barrel size, however, all of the torque-transmitting mechanisms are disposed forward of the space 70.

As with the previously-described power transmissions, the planetary transmission 14H provides six forward speed ratios and one reverse speed ratio through judicious selection of combinations of the torque-transmitting mechanisms 50, 52, 54, 56, and 58.

What is claimed is:

1. A power transmission comprising:
an input shaft;
an output means;
a first planetary gearset, a second planetary gearset, and a third planetary gearset, a member of said first planetary gearset being continuously connected with a member of said third planetary gearset and with said output means;
another member of said first planetary gearset being connected with a member of said second planetary gearset;
another member of said second planetary gearset being continuously connected with said input shaft;
a further member of said second planetary gearset being connected with another member of said third planetary gearset;
a transmission housing including a first end wall, a second end wall, and an outer housing joining said first and second end walls, said housing and said planetary gearsets cooperating to define four spaces including a first space defined between said first end wall and said first planetary gearset, a second space defined between said second end wall and said third planetary gearset, a third space defined radially outward and circumferentially surrounding of said planetary gearsets and inward of said outer housing, a fourth space defined between said first and second planetary gearsets;
five selectively engageable torque-transmitting mechanisms operatively connected with said planetary gearsets including two torque-transmitting mechanisms being disposed in said first space and being operatively connected with members of said first planetary gearset, wherein:
said second and fourth torque transmitting mechanisms have apply pistons slidably disposed in said first end wall and radially stacked within the first space and having friction plates axially aligned within said first space, said fifth torque-transmitting mechanism being disposed radially inward of said friction plates of said second and fourth torque transmitting mechanisms, said third torque-transmitting mechanism being disposed in said fourth space, and said first torque-transmitting mechanism being disposed in said second space, or
first torque-transmitting mechanism being disposed in said third space, said second, third, fourth, and fifth torque transmitting mechanisms disposed in said first space having apply pistons radially stacked with the friction plates of said third, fourth, and fifth torque transmitting mechanisms being radially stacked in said first space, or
said first torque-transmitting mechanism being disposed in said second space, said second and fourth torque transmitting mechanisms being disposed in said first space with the apply pistons being slidably disposed in said first end wall, said third and fifth torque transmitting mechanisms being disposed in said fourth space with the apply pistons thereof being radially stacked and the friction plates thereof being radially stacked, or
first torque-transmitting mechanism being disposed in said second space, said second, third, fourth, and fifth torque transmitting mechanisms being disposed in said first space with the apply pistons and friction plates of said second and fourth torque transmitting mechanisms being axially stacked and with the apply pistons and friction plates of said third and fifth torque transmitting mechanisms being axially stacked radially inward of said second and fourth torque transmitting mechanisms, or
first torque-transmitting mechanism being disposed in said first space, said third torque-transmitting mechanism having the apply piston thereof disposed in said fourth space and having the friction plates thereof disposed radially outward of said second planetary gearset, said second, third, and fifth torque transmitting mechanisms being disposed in said first space with the apply pistons and the friction plates of said fourth and fifth torque transmitting mechanisms being axially stacked and with the second torque-transmitting mechanism being disposed radially outward of said fourth and fifth torque transmitting mechanisms, or
said first torque-transmitting mechanism having the apply piston thereof disposed in said second space, said second torque-transmitting mechanism being disposed in said third space, and said third, fourth, and fifth torque transmitting mechanisms being disposed in said first space with the friction plates thereof being radially stacked, and with the apply pistons of said third and fifth torque transmitting mechanisms being radially stacked in chambers formed in said first end wall, and with the apply pistons of said second and fourth torque transmitting mechanisms being axially stacked, and the apply pistons of said all of said torque transmitting mechanisms being non-rotatable, or
said first torque-transmitting mechanism having a non-rotatable apply piston and being disposed in said third space, said second, third, fourth, and fifth torque transmitting mechanisms having non-rotatable pistons with the friction plates of said third, fourth, and fifth torque transmitting mechanisms are radially stacked, the apply pistons of said second and fourth torque-transmitting mechanisms are radially stacked and the apply pistons of said third and fifth torque transmitting mechanisms are non-rotatable and axially stacked; and
said torque-transmitting mechanisms being engaged in combinations of two to establish six forward speed ratios and one reverse speed ratio.

* * * * *